March 19, 1963     B. DUBSKÝ ET AL     3,081,766
ELECTROMAGNETIC OPEN-CIRCUIT SPIROMETER
Filed Oct. 28, 1959
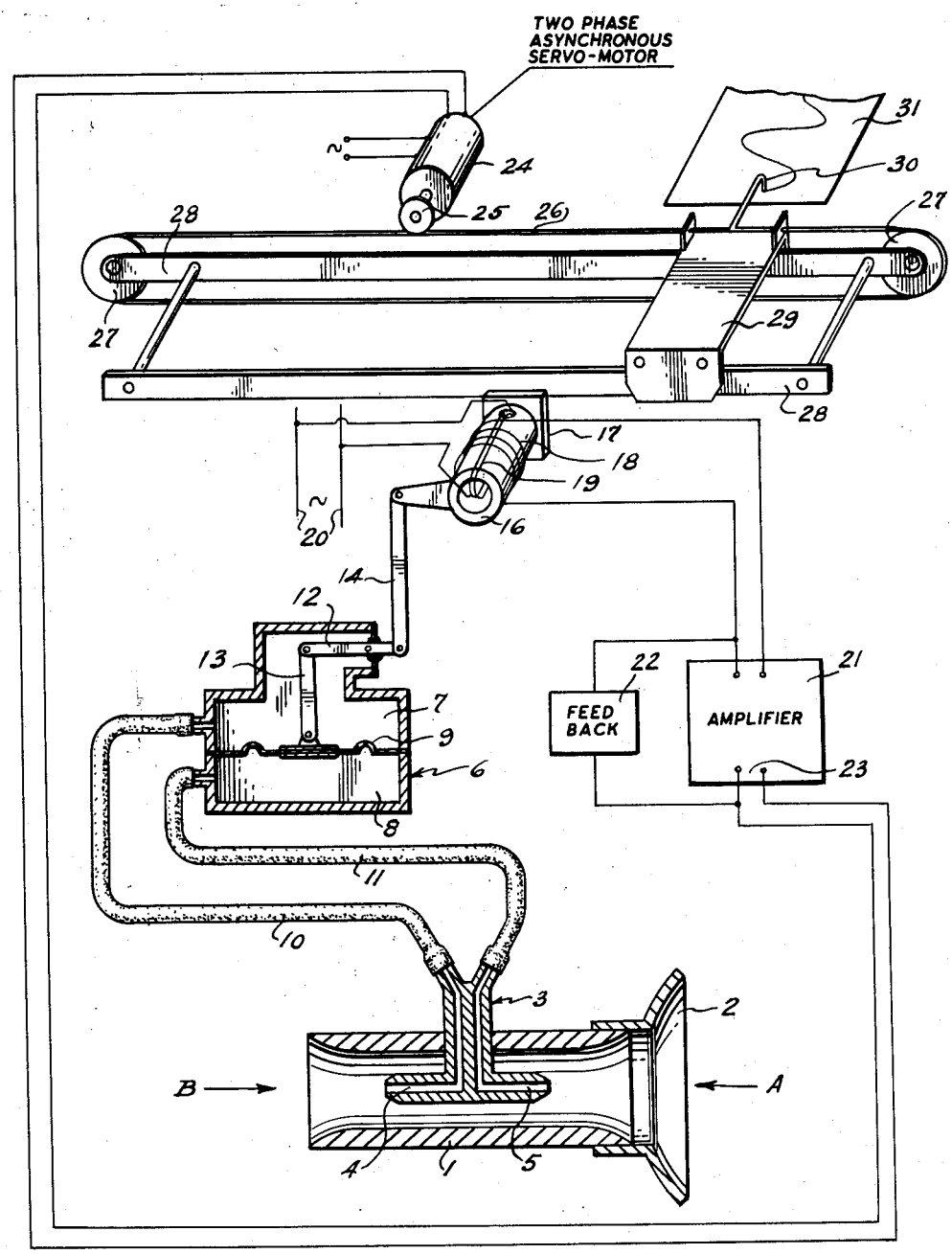
INVENTORS
BOŘIVOJ DUBSKÝ, OLDŘICH STRAKA,
HUBERT FELKEL & RUDOLF FEUEREISL
BY
AGENT

United States Patent Office 3,081,766
Patented Mar. 19, 1963

3,081,766
ELECTROMAGNETIC OPEN-CIRCUIT SPIROMETER
Borivoj Dubský, Oldrich Straka, Hubert Felkel, and Rudolf Feuereisl, Prague, Czechoslovakia, assignors to Vyzkumny a zkusebni letecky ustav, Letnany, near Prague, Czechoslovakia
Filed Oct. 28, 1959, Ser. No. 849,192
Claims priority, application Czechoslovakia Nov. 5, 1958
5 Claims. (Cl. 128—2.08)

This invention relates generally to an open-circuit spirometer for measuring the respiration of a subject, more specifically, the quantities of air that are inhaled and exhaled and the rates at which air is inhaled and exhaled during respiration.

Many different types of spirometers are presently available. Most of these existing spirometers are provided with a container for air or oxygen that is inhaled and exhaled by the subject, that is, with a closed circuit arrangement, and with a mechanical system including a bellows by which a pencil or other stylus is moved across a recording sheet in accordance with the quantities of air that are inhaled and exhaled, thereby to provide a record of the subject's respiration. These existing closed circuit spirometers are extremely complicated and therefore costly to manufacture and maintain, and further are of relatively great size and weight so that they are not conveniently portable for use at the bedside of a patient. Further disadvantages of the existing closed circuit spirometers are the unreliability and frequent breakdowns thereof, the impossibility of effecting efficient sterilization of the device, and the necessity of providing the air or oxygen containers from which the patient inhales.

Accordingly, it is an object of this invention to provide an open circuit spirometer for measuring both the quantities of air that are inhaled and exhaled by the subject or patient and the rates at which the air is inhaled and exhaled, without requiring the use of an air or oxygen container.

Another object is to provide an open circuit spirometer that is constructed and arranged so that those parts with which the patient or subject comes into contact may be conveniently and effectively sterilized.

A further object is to provide an open circuit spirometer of relatively small size and weight so that it is conveniently portable and therefore may be used in laboratories and health centers, as well as at the bedsides of patients in a hospital.

Still another object is to provide an open circuit spirometer in which the moving parts thereof have a negligible inertia, thereby to provide measurements of the respiration of a patient or subject with an increased accuracy.

In accordance with an aspect of this invention, the foregoing objects are achieved by providing a spirometer comprising an open-ended conduit with a mouthpiece at one end through which the patient or subject inhales and exhales, two Pitot tubes disposed in the conduit and respectively opening axially toward the opposite ends of the latter, a substantially closed chamber having a movable wall extending thereacross to divide the chamber into two cells which are respectively communicated with the two Pitot tubes so that the pressures sensed by the latter within the conduit are established in the respective cells or compartments of the chamber, a torsional body provided with exciting and pick-up windings which have their turns arranged substantially at right angles to each other, the torsional body being suitably connected to the movable wall or partition in the chamber so that movements of that wall resulting from differences in the pressures in the two cells cause torsional stressing of the torsional body, a source of alternating current connected with the exciting winding so that torsional stressing of the body causes a signal voltage to be induced in the pick-up winding, and indicating or recording means connected to the pick-up winding so as to be actuated by the signal voltage.

In a preferred embodiment of the invention, the signal voltage from the pick-up winding or coil is fed to an amplifier having a feed-back circuit and a non-linear resistor arranged so that the output from the amplifier is proportional to the square root of the input or signal voltage from the pick-up coil, and therefore proportional to the square root of the difference between the pressures sensed by both Pitot tubes which corresponds to the speed of movement of air through the conduit during inhalation or exhalation by the patient. Further, the output from the amplifier is fed to the control winding of a two-phase asynchronous servo-motor which suitably drives a carriage or movable support carrying a pencil or stylus engaging a strip or web of recording paper that is suitably displaced in the direction at right angles to the direction of movement of the carriage so that the position of the carriage, and hence of the stylus on the recording paper, is proportional to the quantity of air flowing through the conduit.

The above, and other objects, features and advantages of the invention, will be apparent in the following detailed description of an illustrative embodiment thereof which is to be read in connection with the accompanying drawing containing a single diagrammatic view which is partly in section and partly in perspective.

Referring to the drawing in detail, it will be seen that a spirometer embodying this invention includes an open-ended casing or conduit 1 provided with a mouthpiece 2 at one end thereof. A generally T-shaped member 3 extends through the wall of conduit 1 into the interior of the latter and constitutes two Pitot tubes 4 and 5 which open axially within conduit 1 toward the opposite ends of the latter. A chamber 6 has its interior divided into two cells or compartments 7 and 8 by a movable wall or partition 9 in the form of a diaphragm, and the cells 7 and 8 are respectively connected with the Pitot tubes 4 and 5 through hoses or tubes 10 and 11.

The diaphragm 9 is connected through a lever 12 and links 13 and 14 to an arm 15 extending radially from one end of a torsional tube 16 having its other end rigidly secured to a support 17. The torsional tube 16 is provided with a coaxial pick-up coil or winding 18 and with a toroidal exciting winding 19 so that the windings 18 and 19 extend orthogonally, that is, with their turns at right angles, with respect to each other.

The exciting winding 19 is connected to a source of alternating current, for example, feed lines indicated at 20, while the ends of the pick-up coil or winding 18 are connected to the input terminals of an amplifier 21. The amplifier 21 has a feedback circuit 22 and output terminals 23 with the latter being connected to the control winding of a two-phase asynchronous servo-motor 24. A driving pulley 25 is secured on the shaft of servo-motor 24 and engages an endless cable 26 which runs around pulleys 27 rotatably mounted at the opposite ends of one of a pair of parallel rails 28. A wheeled carriage 29 rides on rails 28 and is secured to a run of the cable 26 so as to be displaced along the rails 28 in response to movement of cable 26 by drive pulley 25 under the influence of servo-motor 24. A recording pencil or stylus 30 is mounted on carriage 29 and is engageable with a recording sheet or strip of paper 31 which is continuously displaced in the direction at right angles to the movement of carriage 29 by a mechanism conventionally used for that purpose.

The above described spirometer embodying the present invention operates as follows:

When the patient or subject exhales into the mouthpiece 2, that is, when air flows through the conduit 1 in the direction of the arrow A, the total pressure sensed by the Pitot tube 5, and hence acting in the cell or compartment 8 of chamber 6, is proportional to the rate of flow of air, while static pressure is sensed by the Pitot tube 4 and transmitted through hose 10 to the other cell or compartment 7. The difference between the pressures in cells 7 and 8 exerts a force on the diaphragm 9 which is transmitted through lever 12 and links 13 and 14 to the arm 15 for torsionally stressing or twisting tube 16 in one direction. During inhalation of air by the patient, air flows through conduit 1 in the opposite direction, that is, in the direction of the arrow B, so that the pressures in cells 7 and 8 produce a force on diaphragm 9 in the opposite direction which causes corresponding twisting of torsional tube 16 in the direction opposed to the direction of twisting resulting from exhalation.

While the exciting winding 19 connected to the source 20 of alternating current, the described twisting or torsional stressing of the tube 16 causes an electromotive force or signal voltage to be induced in the pick-up coil or winding 18, which signal voltage has a value proportional to the magnitude of the twist or torsional stress imposed on tube 16 and a phase or polarity which corresponds to the direction of the twist, in a manner more fully disclosed in the commonly assigned United States Letters Patent No. 2,955,461. The signal voltage induced in pick-up coil 18 is amplified, and simultaneously rooted, by the amplifier 21 so that the voltage at the output 23 of amplifier 21 is proportional to the square root of the difference between the pressures acting above and below the diaphragm 9, that is, proportional to the rate or speed of air flow through the conduit 1. The amplified voltage fed from the output 23 of amplifier 21 to the control winding of the two-phase asynchronous servo-motor 24 is effective to cause rotation of the shaft of the motor at a speed which is linearly dependent upon the magnitude of such voltage impressed on the control winding. Since the number of revolutions of the shaft of servo-motor 24 over a predetermined period of time is proportional to the integral of the rotational speed of the shaft during that period of time, that is, proportional to the integral of the voltage impressed on the control winding of the servo-motor during the predetermined time period, it will be apparent that the number of revolutions of the shaft of the servo-motor effected during a predetermined period of time, and hence the displacement of the stylus carrying carriage 29, is proportional to the integral of the rate or speed of air flow through the conduit 1. Since the cross-sectional area of the conduit 1 is constant, the number of revolutions of the servo-motor shaft effected during a predetermined period of time is also proportional to the integral of the sum of the air speed and the cross-sectional area of the conduit 1, that is, proportional to the quantity of air passing through the conduit 1 during the predetermined period of time. Since the shaft of servo-motor 24 drives carriage 29 through pulley 25 and cable 26 passing around pulleys 27, it will be apparent that the recording pencil or stylus 30 on carriage 29 undergoes a displacement which corresponds to the quantity of air passing through conduit 1 in the predetermined period of time and provides a permanent record of such displacements on the record sheet or strip 31.

Since the polarity of phase of the voltage impressed on the control winding of the servo-motor 24 is reversed when the patient exhales, as compared with the polarity or phase when the patient inhales, it is obvious that the shaft of servo-motor 24 is rotated in opposite directions for exhalation and inhalation, respectively, thereby to correspondingly displace the carriage 29 in opposite directions, so that the record on sheet 31 can be easily interpreted with respect to the portions thereof indicating inhalation and exhalation, respectively, by the patient.

It will be apparent that, in the above described spirometer embodying this invention, the assembly constituted by the conduit 1, mouthpiece 2 and member 3, which assembly is contacted by the patient or subject, may be conveniently sterilized. Further, since the various moving parts of the described spirometer may be constructed with negligible inertias, the record provided by the spirometer very accurately corresponds to the respiration of the patient or subject. By reason of the relative simplicity of the described spirometer, it may be relatively cheaply produced in a light-weight and compact form so as to facilitate its use in the examination of patients or subjects in laboratories or health centers, as well as at bedsides in hospitals.

Although an illustrative embodiment of this invention has been described in detail herein with reference to the accompanying drawing, it is to be understood that the invention is not limited to that precise embodiment, and that various changes and modifications may be effected therein by one skilled in the art without departing from the scope or spirit of the invention, except as defined in the appended claims.

What we claim is:

1. In a spirometer, in combination, a conduit having two open ends and a mouthpiece on one of said ends; two Pitot tubes in said conduit respectively facing said ends; a substantially closed chamber; a movable wall in said chamber and dividing the same into two cells, each of said cells communicating with one of said Pitot tubes; a support; a tubular body having a longitudinal axis, one axial end portion of said tubular body being secured to said support; linkage means connecting said wall to the other axial end portion of said tubular body for stressing said body in torsion about the longitudinal axis thereof when said wall moves; a first elongated conductor substantially coaxially wound on said body; a second elongated conductor toroidally wound on said body, each of said conductors having two terminal portions; a source of alternating current in circuit with the terminal portions of one of said conductors; and indicating means in circuit with the terminal portions of the other conductor.

2. In a spirometer, the combination of a conduit having substantially unobstructed, open opposite ends and a mouthpiece on one of said ends so that inhalation and exhalation through said mouthpiece causes unimpeded flow of gas through said conduit, first and second Pitot tubes in said conduit facing toward said opposite ends, respectively, and signal generating means connected with said Pitot tubes and responding to a difference between the pressures sensed by said tubes to generate a signal corresponding to the rate of flow of gas through said conduit in either direction between said mouthpiece and the other end of the conduit.

3. In a spirometer, the combination of a conduit having substantially unobstructed, open opposite ends and a mouthpiece on one of said ends so that inhalation and exhalation through said mouthpiece causes unimpeded flow of gas through said conduit; first and second Pitot tubes in said conduit facing toward said opposite ends, respectively; pressure sensitive means connected to said Pitot tubes and operative to generate a mechanical force corresponding to a difference in the pressures sensed by said Pitot tubes upon a flow of gas through said conduit in either direction between said mouthpiece and the other end of said conduit; and means actuated by said mechanical force to generate a corresponding electrical signal.

4. In a spirometer, the combination as in claim 3; wherein said means for generating an electrical signal includes an elongated body, means for torsionally stressing said body by said mechanical force, first and second windings wound substantially at right angles with respect to each other on said body, and a source of alternating current connected to one of said windings so that torsional stressing of said body by said mechanical force causes a signal voltage to be induced in the other of said windings.

5. In a spirometer, the combination as in claim 3; wherein said pressure sensitive means includes means defining a substantially closed chamber, and a movable wall in said chamber dividing the latter into first and second cells communicating with said first and second Pitot tubes, respectively, so that a difference between the pressures sensed by the Pitot tubes and acting in said cells applies a resultant force to said wall tending to move the latter.

References Cited in the file of this patent

UNITED STATES PATENTS

| | | |
|---|---|---|
| 471,389 | Lacey | Mar. 22, 1892 |
| 1,041,432 | Cole | Oct. 15, 1912 |
| 2,193,945 | Strauss | Mar. 19, 1940 |
| 2,315,756 | Warner | Apr. 6, 1943 |
| 2,408,661 | Lee | Oct. 1, 1946 |
| 2,837,083 | Lanooy | June 3, 1958 |